United States Patent
Christensen

(10) Patent No.: US 9,991,965 B2
(45) Date of Patent: Jun. 5, 2018

(54) DRIVER CIRCUIT FOR AN ELECTRO-ABSORPTION OR MICRO-RING MODULATOR AND OPTICAL TRANSMITTER COMPRISING SUCH DRIVER CIRCUIT

(71) Applicant: MELLANOX TECHNOLOGIES DENMARK APS, Roskilde (DK)

(72) Inventor: Steen Bak Christensen, Roskilde (DK)

(73) Assignee: Mellanox Technologies Denmark APS, Roskilde (DK)

( * ) Notice: Subject to any disclaimer, the term of this patent is extended or adjusted under 35 U.S.C. 154(b) by 0 days. days.

(21) Appl. No.: 14/884,110

(22) Filed: Oct. 15, 2015

(65) Prior Publication Data
US 2016/0119062 A1    Apr. 28, 2016

(30) Foreign Application Priority Data

Oct. 28, 2014  (DK) ................................ 2014 70658

(51) Int. Cl.
*H04B 10/04*    (2006.01)
*H04B 10/50*    (2013.01)
(Continued)

(52) U.S. Cl.
CPC ......... *H04B 10/505* (2013.01); *G02F 1/0121* (2013.01); *G02F 2001/0155* (2013.01); *G02F 2001/0157* (2013.01)

(58) Field of Classification Search
CPC .... H04B 10/50; H04B 10/564; H04B 10/516; H04B 10/503; H04B 10/504; H04B 10/54; H04B 10/541
(Continued)

(56) References Cited

U.S. PATENT DOCUMENTS 5,646,763 A * 7/1997 Misaizu ............... H04B 10/504
                                                    372/34
5,706,117 A * 1/1998 Imai ...................... G02F 1/0123
                                                    372/29.02
(Continued)

FOREIGN PATENT DOCUMENTS

EP        0673093 A2    9/1995
EP        0911997 A2    4/1999

OTHER PUBLICATIONS

Danish Search Report and Opinion dated May 28, 2015, by the Danish Patent Office in corresponding Danish Application No. PA 2014 70658. (7 pages).

*Primary Examiner* — Hanh Phan
(74) *Attorney, Agent, or Firm* — Alston & Bird LLP

(57) ABSTRACT

A modulator driver circuit for providing a drive voltage to an electro-absorption modulator, such a Franz-Keldysh modulator, or to a micro-ring modulator, and an optical transmitter including such driver circuit, where said driver circuit includes a differential amplifier and at least one differential branch of the differential amplifier being provided with a voltage offset. This provides for a bias voltage being adjustable within the driver circuit itself. Preferably, the differential amplifier is arranged for supplying drive voltage to two complementary driver outputs providing a reverse bias relative to the modulator. In one embodiment, the differential amplifier includes a cascode in the differential branch not being provided with the voltage offset.

20 Claims, 2 Drawing Sheets

(51) Int. Cl.
*G02F 1/01* (2006.01)
*G02F 1/015* (2006.01)

(58) Field of Classification Search
USPC ....... 398/183, 186, 187, 192, 193, 194, 195,
398/197, 198, 135, 136, 158, 159;
372/29.01, 29.012, 32, 34, 36, 38.02
See application file for complete search history.

(56) References Cited

U.S. PATENT DOCUMENTS

| | | | |
|---|---|---|---|
| 6,606,177 B1* | 8/2003 | Chujo | H04B 10/504 398/182 |
| 6,707,589 B2* | 3/2004 | Bostak | G02F 1/0121 345/100 |
| 7,099,596 B2 | 8/2006 | Watanabe et al. | |
| 8,615,173 B1* | 12/2013 | Lentine | H04B 10/0799 398/182 |
| 2003/0180054 A1* | 9/2003 | Watanabe | H04B 10/505 398/182 |
| 2009/0245813 A1 | 10/2009 | Bonthron | |
| 2010/0102884 A1 | 4/2010 | Takaso | |
| 2012/0183306 A1* | 7/2012 | Inoue | H04B 10/505 398/183 |
| 2013/0016745 A1* | 1/2013 | Moto | H01S 5/0265 372/29.011 |

* cited by examiner

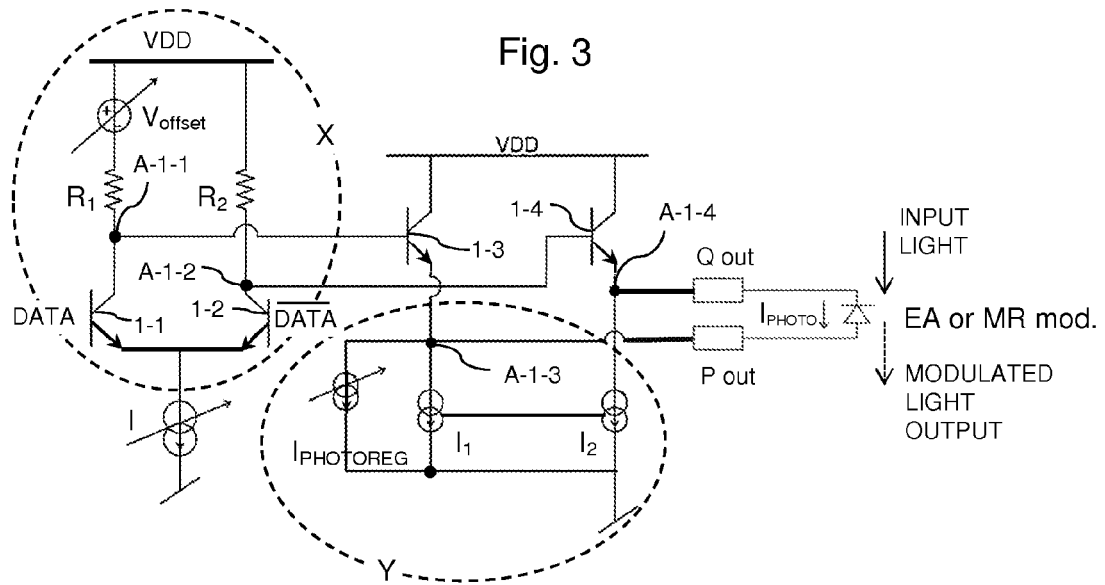
Fig. 3
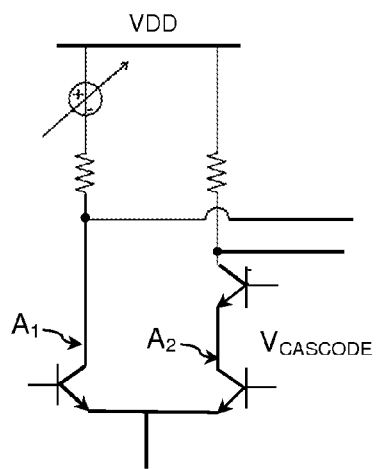
Fig. 4
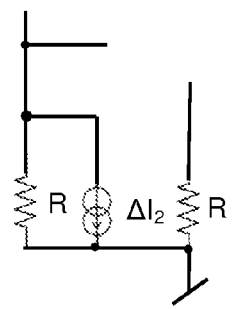
$I_1 = I_2 + \Delta I$
Fig. 5A
Fig. 5B

DRIVER CIRCUIT FOR AN ELECTRO-ABSORPTION OR MICRO-RING MODULATOR AND OPTICAL TRANSMITTER COMPRISING SUCH DRIVER CIRCUIT

BACKGROUND OF THE INVENTION

This invention relates generally to an optoelectronic modulator driver circuit, and more specifically to driver circuits for controlling and powering electro-absorption or micro-ring modulators; as well it relates to an optical transmitter comprising such driver circuit.

High speed optical transmission networks in the area of around 25-50 Gb/s often rely on the modulation of light in order to transmit data. Lasers are often used as the light source for this light data. Rather than modulating the laser itself directly a separate modulator is sometimes used. The laser is operated in continuous wave mode and the laser light is then passed into a light modulator. The modulator varies the amount or intensity of the laser light passed through it.

One such type of modulator is the electro-absorption (EA) modulator, another more recently discussed modulator type is the micro-ring modulator.

The EA modulator takes a generally laser diode light input and generates intensity-modulated light signals in accordance with applied voltage over it (drive voltage). EA modulators comprise the Franz-Keldysh (FK) type modulator, which operate based on the Franz-Keldysh effect, where even conventional semiconductors show the effect of tunneling which allows overlap of electron and hole wave functions for photon energies less than the band gap energy. FK modulators can be operated at very high speed and modulation bandwidth of tens of gigahertz can be achieved.

The other mentioned type of modulator is the micro-ring (MR) modulator or resonant micro-ring modulator, which is applicable to optical switching. It consists of a micro-ring with resonator modes, sometimes spaced by approximately 100 GHz, intended for use in wavelength-division-multiplexed (WDM) systems. This spacing allows the micro-ring to operate as a comb switch on a broadband-wavelength-parallel data stream in much the same way a smaller-diameter ring would act upon a single-channel signal. The MR modulator is based on resonant micro-ring attenuation often provided in silicon for forming a ring-resonator-based silicon modulator. When light of one or more selected resonant wavelengths of the modulator is passed through the MR modulator from an input waveguide, the light intensity builds up over multiple round-trips due to constructive interference. Because only a select few wavelengths will be at resonance within the micro-ring, it functions as a filter or modulator of the light input.

Many such diode based modulators, including the FK and MR modulators, are characterized by requiring a bias and by generating a photocurrent which is directly related to the amount of light being absorbed. Thus, at least three features are required of the electronic circuits attached to such a modulator, such as the FK or MR modulator: 1) ability to provide bias for the drive voltage, 2) ability to source and/or sink the photocurrent, and 3) ability to provide the modulation using fast signal adjustment, i.e. high frequency (or so-called AC) signals.

In known implementations these electronic driver circuits have been implemented as high speed drivers monolithically provided on an integrated circuit, IC or microchip, connected to the modulator through the high frequency path of a so called bias-T. In FIG. 1 a bias-T, indicated by the dashed box, is shown comprising two bias-T circuits, $L_1$, $C_1$ and $L_2$, $C_2$, respectively, one for the low frequency signal and one for the high frequency signal path into the modulator in question by the set voltage swing on the 50Ω driver and of the values of the capacitors $C_1$ and $C_2$. The necessary offset voltage provides the bias for the drive voltage on the complementary driver outputs and is provided via the inductors L1 and L2 in series with a voltage offset. High speed, such as picosecond, bias-T's are available today which can supply an active device like an optical modulator with such a bias voltage while allowing said high speed ultra-broadband signals to pass through and allow minimum signal degradation.

Bias-T's are implemented with discrete and external components because the component values needed generally are too large for integration in either the driver IC or the modulator itself. Large capacitance and/or inductance values are needed in order to reduce the cross-over frequency which distinguishes the high and low frequency paths. This is required in many high speed communication systems since the energy spectrum of the modulation signal has components at very low frequencies. Failing to couple this signal components onto the modulator will lead to distortion and degradation of the resulting frequency signal.

An EA, such as a FK modulator, and a MR modulator requires a voltage swing $V_{mod}$ over the terminals thereof for driving the fast signal, and this previously entailed the use of external high-quality voltage supply. Now, in GaAs, Si based such as GE-on-Si modulators, high in-plane electric fields can be generated with moderate voltages. Furthermore, a low capacitance of these structures is particularly favorable for high speed applications. The necessary voltage swing can therefore be generated by a differential amplifier supplying a differential signal to the modulator input.

U.S. Pat. No. 7,099,596 describes an optical transmitter comprising an EA modulator and its driver circuit, where the driver circuit comprises such differential pair and an emitter follower circuit at the output stage of the driver circuit, see FIG. 2. The modulator drive voltage is herein provided by supplying voltage VCC1 over the differential pair of one branch thereof and over an emitter follower 1-4 which provides the modulator drive voltage on a single end outputted to the modulator in reverse bias. By using a single-ended output a relatively high voltage swing is needed.

SUMMARY OF THE INVENTION

It is an object of the invention to provide an driver circuit for an EA modulator, such as an FK modulator, or for a MR modulator, and an optical transmitter comprising such driver circuit and modulator, which overcomes said disadvantages of the prior art.

According to a first aspect of the invention there is provided a modulator driver circuit for providing a drive voltage to an electro-absorption or micro-ring modulator, said driver circuit comprising a differential amplifier and at least one differential branch of the differential amplifier being provided with a voltage offset. Preferably, said differential amplifier is arranged for supplying drive voltage to two complementary driver outputs providing a reverse bias relative to the modulator.

Providing the voltage offset in one branch of the differential amplifier and using complementary outputs allows direct connection of the driver to the modulator without the use of a bias-T or other coupling components such as capacitors. The direct connection allows higher density, reduced cost, and a lower cut-off frequency—in fact zero— compared to known implementations. Also, by providing a built-in adjustable voltage offset, the adjustment of this does not affect the operating conditions of the entire IC, as would be the case in the driver of '596. By providing the driver voltage on two complementary driver outputs, and using the differential amplifier, then the voltage swing need only be half as big, which leads to an added advantage that the circuit elements may be selected smaller, have lower parasitic capacitances and thus be faster. Therefore, the driver circuit also needs half the power of the driver of '596 because the tail-current in the differential pair need only be half as big to provide the necessary voltage swing. Further, by providing the voltage offset in one differential branch, the supply voltage for the driver can be chosen without being dependent upon the bias of the modulator.

According to a second aspect of the invention there is provided a modulator driver circuit for providing a drive voltage to an electro-absorption or micro-ring modulator, said driver circuit comprising a differential amplifier and at least one differential branch of the differential amplifier being provided with a voltage offset, and said differential amplifier comprising a cascode in the differential branch not being provided with the voltage offset. Preferably, said differential amplifier is arranged for supplying drive voltage to two complementary driver outputs providing a reverse bias relative to the modulator.

The introduction of the adjustable voltage offset in one branch introduces a certain asymmetry in the DC operating conditions for the transistors of the differential amplifier, which DC conditions ideally should be identical. By adding the cascode setup this asymmetry can be overcome because it allows independent control of the voltage at the collector terminal of the transistor in its branch. The cascade is an element that provides a high input resistance and a large current gain. A cascode is a two-transistor configuration formed by a common-emitter/-source stage followed by a common-base/-gate stage. The cascode has the same overall current and voltage gains of a common-emitter/-source stage, the same input resistance, and a larger output resistance. The voltage swing on this output is then reduced, so complete symmetry is not achieved, but this may be partly compensated by suitable selection of the driver element values.

According to another aspect of the invention there is provided an optical transmitter comprising one or more such driver circuits.

BRIEF DESCRIPTION OF THE DRAWINGS

The invention is best understood from the following detailed description when read in connection with the accompanying drawing, where the various features are not to scale and the same reference numbers generally denote the same features.

FIG. 3 shows a schematic circuit diagram of an optical transmitter according to the invention comprising a driver circuit according to a first aspect of the invention and an electro-absorption or MR modulator;

FIG. 4 shows a schematic circuit diagram of a driver circuit part as indicated with X on FIG. 3 for providing a second aspect of the present invention;

FIG. 5A, 5B show in three different embodiments of the present invention schematic circuit diagrams of driver circuit parts as indicated with Y in FIG. 3.

DETAILED DESCRIPTION OF THE INVENTION

Figure 1:
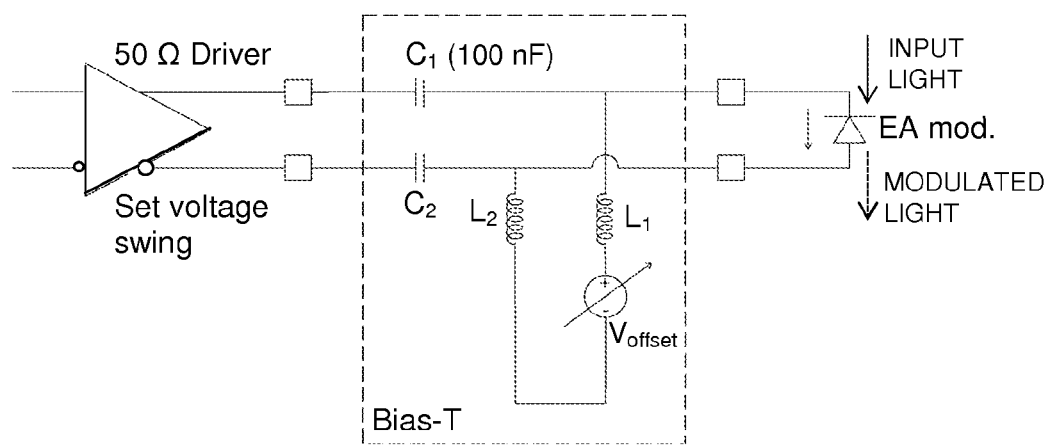
FIG. 1 shows a schematic circuit diagram of a prior art optical transmitter already discussed above comprising a driver, a bias-T and an electro-absorption modulator.
Figure 2:
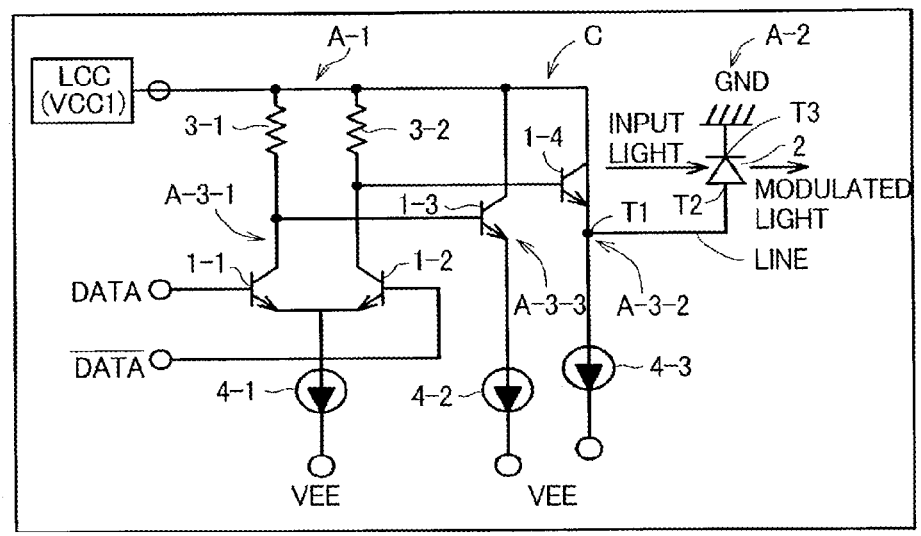
FIG. 2 shows a schematic circuit diagram of a prior art optical transmitter as described in U.S. Pat. No. 7,099,596 comprising a differential pair in connection with an emitter follower and supplying an electro-absorption modulator.

FIG. 2 from U.S. Pat. No. 7,099,596 shows a known example of a driver circuit using a differential pair for providing drive voltage to complementary outputs in an optical transmitter C comprising a voltage generating circuit LCC for applying a desired voltage to a common collector terminal of a differential amplifier A-3-1. The voltage VCC1 applied to the common collector terminal by the voltage generating circuit LCC is variable for adjustment of the applied voltage between the common collector terminal and VEE. The capacitance between output terminal T1 of the emitter follower circuits A-3-2 and the voltage input terminal T2 of the optical modulator 2 is not increased hereby. This is an improvement relative to the bias-T setup, and still retains the adjustable drive voltage. However, by adjusting the voltage VCC1 the entire circuit is affected and must be re-considered.

Relative to the bias-T, in order to achieve the same modulation current with a single-ended drive as a differential drive as in the bias-T, the amplitude of the voltage swing over the modulator should remain the same. This means that the voltage swing at A-1-3 for the differential drive ($V_A$-$V_B$) should equal the voltage swing $\Delta VA$ for the single-ended drive. Therefore, the voltage swing over the parasitic capacitors for the differential amplifier is only half of that for a single-ended amplifier as in '596. The overall effect is that using a differential amplifier as in '596 leads to a faster signal transmission.

By arranging an emitter follower circuit at the output stage of the driver circuit, the delay time i.e. maximum operating frequency is determined by the current flowing to the emitter follower circuit, and the charge-and-discharge time of the capacitance C of the optical modulator. Thus, greater magnitudes of current to the emitter follower can enable high speed performance.

Neither the bias-T or the '596 setup compensates for photocurrent: during operation, where when light is incident on the modulator for the electro-absorption modulator types such as FK, or for the MR modulator, the photocurrent $I_{PHOTO}$ being generated over it flows through the modulator in reverse. This means that the driver will experience a current flowing out of the positive pin and into the negative pin and this impact the biasing of the driver such that the biasing for the p side must be different than for the n side. The '596 document does not describe compensating for this photocurrent.

In FIG. 3 is shown an optical transmitter according to the invention comprising an electro-absorption modulator, such as a FK modulator, or an MR modulator, generally indicated by a diode symbol, and a driver circuit according to a first aspect of the invention. The driver circuit according to the invention is adapted as to provide for a bias voltage being adjustable within the driver circuit itself. Further, the driver circuit is also adapted so as to be able to compensate for the photocurrent, indicated by the right-most downwards pointing arrow $I_{PHOTO}$, and being generated by the diode during operation.

The driver circuit of FIG. 3 comprises a differential amplifier, indicated by the dashed ellipse X, in the shape of a differential pair having two branches. One of the two differential branches A-1-1 of the amplifier is provided with a voltage offset $V_{OFFSET}$ and it is connected at its other complementary output $P_{OUT}$ to a modulator via a first emitter follower circuit 1-3. Other types of differential amplifiers than a differential pair can be envisaged by the skilled person, such as operational trans-conductance amplifier (OTA), using a cascode, see FIG. 4, and/or cascode mirror, and/or telescopic cascodes. The other of the two differential branches of the amplifier A-1-2 is connected at its other complementary output $Q_{OUT}$ to said modulator via a second emitter follower circuit 1-4. Each differential branch contains a bipolar transistor 1-1, 1-2, respectively, serially connected to a load resistor $R_1$, $R_2$, respectively, and the branches are commonly through their emitters connected to ground through a current sink I, which supplies the DC drive current for driving the differential amplifier to provide the fast signal. Other components setups of the differential amplifier can be contemplated by the skilled person. One or more of said emitter followers/transistors/cascodes can be substituted by one or more MOSFET's. The two bipolar transistors 1-1 and 1-2 each have a base terminal (or gate if MOSFET) to which a data signal DATA and an inverted data signal $\overline{DATA}$ is being input, i.e. here supplying the signal voltage, which depend on type of modulator being used, for providing the modulation signal frequency. Due to its symmetrical nature, by using a differential amplifier driver application, as compared to the Bias-T for example, it exhibits better immunity from capacitive loads on the output thereof.

Advantageously, the voltage offset of the driver output is adjusted to be equal to half the value of the signal voltage swing ($V_A$-$V_B$) over the modulator supplied by the current sink I. Thus, the voltage provided on the bias of the modulator exactly matches as high an extinction ratio on the modulator as possible. It may be preferred to adjust to just slightly more than half the value of the signal voltage swing to ensure that the modulator is not provided with a positive voltage at any time, and in fact one may also adjust to a voltage larger than half this value to ensure this.

The first emitter follower circuit 1-3 at its output stage has its transistor connected with a current sink collection, indicated by the dashed ellipse Y. The second emitter follower circuit 1-4 is provided at its output stage has its transistor connected with the current sink collection Y. The base of transistor 1-3 is being input an inverted differential output of the differential amplifier A-1-1. The base of transistor 1-4 is being input a differential output of the differential amplifier A-1-2.

In an alternative embodiment, no such emitter follower circuits are provided between the outputs from the differential amplifier and complementary outputs of the driver. This is not preferred because then the bias for the differential amplifier can be affected adversely by the photocurrent from the modulator.

The current sinks of the current sink collection Y are supplying (negative) current to the first and second emitter follower circuit 1-3 and 1-4, respectively. The first emitter follower circuit 1-3 is connected in series with the current sink $I_1$. The second emitter follower circuit 1-4 is connected in series with the current sink $I_2$. The current sink collection Y is made adjustable at A-1-3 by the provision of adjustable current sink $I_{PHOTOREG}$ supplying the first emitter follower circuit 1-3 provided after the differential branch comprising the voltage offset. The three current sinks $I_1$, $I_2$ and $I_{PHOTOREG}$ are provided in parallel to each other in current sink collection Y, and by the horizontal line between the sinks $I_1$, $I_2$ is shown that $I_1$, $I_2$ are of equal value, stabilizing the circuit. During operation, transistor 1-4 is supplied a bias current of $I_2+I_{PHOTO}$. Advantageously, transistor 1-3 has a bias current of equal value, and this is the case, when $I_{PHOTOREG}+I_1$=Bias current of transistor 1-4+$I_{PHOTO}$=$I_2$+$I_{PHOTO}+I_{PHOTO}$=$I_2+2*I_{PHOTO}$, i.e. $I_{PHOTOREG}=2*I_{PHOTO}$, when $I_2=I_1$. Other current values may be supplied to the emitter followers, advantageously $I_2+2*I_{PHOTO}=I_{PHOTOREG}+I_1$ is then compensating the $I_{PHOTO}$.

Further, other setups of the current sink collection Y can be contemplated within the present invention, see below for FIGS. 5A and 5B.

Thus, any photocurrent $I_{PHOTO}$ being generated by the diode during operation can be compensated by the adjustable compensation current $I_{PHOTOREG}$. Then $P_{out}$ and the $Q_{out}$ are provided the same bias current.

By the provision of an adjustable current sink for the emitter follower for the differential amplifier branch comprising the adjustable voltage offset, and by the relative large, i.e. not negligible photocurrent generated by the FK and MR modulators can be compensated for, at the same time with the same driver circuit.

In FIG. 4 is shown a second aspect of the driver circuit of the present invention, where the differential amplifier as indicated by the ellipse X in FIG. 3 is to be envisaged to be substituted with the circuit shown in FIG. 4, otherwise the rest of the driver circuit is the same as in FIG. 3. The differential amplifier of FIG. 4 relative to FIG. 3 additionally comprises a cascode in that branch of the amplifier which does not contain the offset voltage $V_{offset}$. A cascode is configuration of two transistors above each other formed by a common-emitter/-source stage followed by a common-base/-gate stage, and is in itself known to the skilled person. The cascode setup provide an as good or better voltage gain, but a much larger output resistance than a common-emitter/-source stage by itself does. This offers a way of providing a better high-frequency performance of this branch. As seen in FIG. 4 one of the two transistors of the cascode is provided by the one transistor of the differential amplifier, which is not in the branch of the voltage offset $V_{offset}$.

Advantageously, one, some or all of the transistors of the driver circuit according to the invention can be bipolar npn transistors and/or nMOS transistors. It is not preferred, but possible, to substitute one or more of the npn transistors with pnp, because these are much slower and thus not suitable for the present high speed circuits.

FIGS. 5A and 5B show two different embodiments of the current sink collection Y, respectively in a driver circuit e.g. as shown in FIG. 3, or alternatively, as shown in a driver circuit of FIG. 3 where X is substituted with the cascade of FIG. 4. In FIG. 5A is shown a circuit comprising two non-adjustable current sources in parallel $I_1$, $I_2$, where the value of $I_1$ is equal to $I_2+I_{PHOTOREG}$. In FIG. 5B is shown a circuit comprising one adjustable current source $I_{PHOTOREG}$ in parallel with two equal value resistances R, R. Preferably, the current sink is as shown in FIG. 5B, More preferred, the current sink is as shown in FIG. 3.

While the invention has been described with respect to particular embodiments, those of ordinary skill in the art will appreciate variations in structure and substitutions of materials and features that are within the scope and spirit of the invention.

I claim the following:

1. A modulator driver circuit for providing a drive voltage to a modulator, said driver circuit comprising:
    a differential amplifier, wherein at least one differential branch of the differential amplifier is provided with a voltage offset; and
    two complementary driver outputs, wherein the differential amplifier is arranged to supply a drive voltage to the two complementary driver outputs and wherein the two complementary driver outputs are configured to provide a reverse bias relative to the modulator.

2. The driver circuit of claim 1, said voltage offset providing a voltage equal to or higher than Vmod/2 between said two complementary outputs.

3. The driver circuit of claim 1, the driver circuit being directly connected to said two complementary outputs.

4. The driver circuit of claim 3, further comprising a current sink connected to at least one of said two complementary outputs.

5. The driver circuit of claim 4, said current sink being adjustable to effectively twice the value of the average photocurrent being produced from said modulator during use.

6. The driver circuit of claim 4, wherein the current sink is connected to an output connected to the differential branch being provided with said voltage offset.

7. The driver circuit of claim 1, said driver circuit being connected to said two complementary outputs through at least one emitter follower circuit.

8. The driver circuit of claim 7, further comprising a current sink connected to at least one of said two complementary outputs.

9. The driver circuit of claim 8, said current sink being adjustable to effectively the same current magnitude as the average photocurrent being produced from said modulator during use.

10. The driver circuit of claim 1, wherein the modulator is an electro-absorption modulator or a micro-ring modulator.

11. A modulator driver circuit for providing a drive voltage to a modulator, the driver circuit comprising:
    a differential amplifier, wherein at least one differential branch of the differential amplifier is provided with a voltage offset;
    two complementary driver outputs, wherein the differential amplifier is arranged to supply a drive voltage to the two complementary driver outputs and wherein the two complementary driver outputs are configured to provide a reverse bias relative to the modulator; and
    a cascode in a differential branch that is not provided with the voltage offset.

12. The driver circuit of claim 11, said voltage offset providing a voltage equal to or higher than Vmod/2 between said two complementary outputs.

13. The driver circuit of claim 11, the driver circuit being directly connected to said two complementary outputs.

14. The driver circuit of claim 13, further comprising a current sink connected to at least one of said two complementary outputs.

15. The driver circuit of claim 14, said current sink being adjustable to effectively twice the value of the average photocurrent being produced from said modulator during use.

16. The driver circuit of claim 14, wherein the current sink is connected to an output connected to the differential branch being provided with said voltage offset.

17. The driver circuit of claim 11, said driver circuit being connected to the two complementary outputs through at least one emitter follower circuit.

18. The driver circuit of claim 17, further comprising a current sink connected to at least one of said two complementary outputs.

19. The driver circuit of claim 18, said current sink being adjustable to effectively the same current magnitude as the average photocurrent being produced from said modulator during use.

20. The driver circuit of claim 11, wherein the modulator is an electro-absorption modulator or a micro-ring modulator.

* * * * *